United States Patent [19]

White et al.

[11] Patent Number: 5,498,672

[45] Date of Patent: Mar. 12, 1996

[54] PROCESS FOR PRODUCING HIGH 1,2-ENRICHED POLYBUTADIENE LATICES

[75] Inventors: Dwain M. White, Schenectady; Janet L. Gordon, Clifton Park, both of N.Y.

[73] Assignee: General Electric Company, Schenectady, N.Y.

[21] Appl. No.: 352,271

[22] Filed: Dec. 7, 1994

Related U.S. Application Data

[63] Continuation of Ser. No. 119,689, Sep. 13, 1993, abandoned.

[51] Int. Cl.$^6$ .................................................. C08F 279/02
[52] U.S. Cl. .............................................. 525/314; 525/315
[58] Field of Search ............................. 525/315, 314

[56] References Cited

U.S. PATENT DOCUMENTS

| | | | |
|---|---|---|---|
| 4,742,137 | 5/1988 | Ono et al. | 526/92 |
| 5,021,381 | 6/1991 | Burroway et al. | 502/117 |
| 5,283,294 | 2/1994 | Hsu et al. | 525/247 |

FOREIGN PATENT DOCUMENTS 5969611  5/1980  Japan.

OTHER PUBLICATIONS

Translation of Japan 55–69611 (May 1980).
Polymer, 1974, vol. 15, Dec. Letter, "13Cn.m.r. Spectra of Polybutadienes": 2, pp. 816–818.
Polymer, 1982, vol. 23, Feb. Makino et al., "Structural Characterization of 1,2–Polybutadiene by 13Cn.m.r. Spectroscopy": 1. Signal Assignement in Hydrogenated Polybutadienes, pp. 287–290.

*Primary Examiner*—Vasu S. Jagannathan
*Attorney, Agent, or Firm*—Edward A. Squillante, Jr.; William H. Pittman

[57] ABSTRACT

Novel polymer compositions that comprise high 1,2-enrichment are described herein. Said polymer compositions have up to about 50% by weight of 1,2 units wherein about 25% to about 75% by weight of all 1,2 units are present in the polymer backbone. Additionally a novel process is disclosed for producing polymer compositions by dissolving a polydiene in a monomeric diene during emulsion polymerization conditions.

4 Claims, No Drawings

PROCESS FOR PRODUCING HIGH 1,2-ENRICHED POLYBUTADIENE LATICES

This application is a continuation of application Ser. No. 08/119,689 filed Sep. 13, 1993, abandoned.

FIELD OF THE INVENTION

This invention relates to novel polymer compositions. Particularly, the polymer compositions described herein are high 1,2-enriched polybutadiene latices as well as homologs derived therefrom. Moreover, said invention describes a process for producing the above-mentioned polymer compositions.

BACKGROUND OF THE INVENTION

For many years, the natives of South and Central America found use for a latex obtained from the barks of certain trees. Said latex was often a cis- or trans-1,4-polyisoprene and it was recovered from rubber trees via a tapping process similar to the one used to recover maple sugar.

In the early nineteenth century, individuals such as Hancock in England and Goodyear in the United States discovered that mixing natural rubber with sulfur yielded a moldable composition which could be vulcanized and converted to a variety of commercial products. Such commercial products included waterproof coats and boots as well as solid tires for transportation vehicles.

In the period between World Wars I and II, the development of synthetic rubbers was pursued; especially in the United States. During this period, a program was instituted to produce synthetic rubbers such as styrene-butadiene (SBR) which resulted in a decrease in America's dependence on rubber imports as well as an increase in synthetic polymer production.

Presently, synthetic polymers such as acrylonitrile-butadiene-styrene copolymers (ABS) are produced by grafting monomers onto a rubbery polymer backbone in a latex. In the case of ABS, acrylonitrile and styrene are frequently grafted onto rubbery polybutadiene and/or a rubbery styrene-butadiene copolymer in a latex. Prior to grafting, said latex of rubbery polybutadiene is generally admixed with the monomers to be grafted thereon and the mixture is usually agitated for a period of up to several hours to emulsify the monomers and to enable the rubbery polymer to absorb them before initiating the grafting reaction.

Typically, the above-mentioned rubbery backbone polymer is prepared via processes that subject, for instance, butadiene to catalysts of the alfin or amylsodium type. More typically, polybutadiene latices are produced by emulsion polymerization techniques that employ an aqueous emulsion of butadiene, an anionic emulsifier and a free radical initiator. The polymer backbones produced by the processes described above consist of usually about 80% by weight of 1,4-polybutadiene units (1,4-enrichment) and about 20% by weight of 1,2-polybutadiene units based on total weight of the polymer in the latex. Moreover, said 1,2-polybutadiene units are present as isolated units or as blocks in the polymer backbone, and the blocks are often less than four butadiene units in length.

It has been of increasing interest to prepare polybutadiene latices, as well as homologs derived therefrom, that comprise high 1,2-enrichment. This is true since it is expected that high 1,2-enrichment will enhance the activity of the polymer latices during conventional grafting reactions.

Accordingly, the instant invention is based on the discovery of novel polybutadiene latices, as well as homologs derived therefrom. Said novel latices comprise greater than about 20% by weight and up to about 50% by weight of 1,2 units (1,2-enrichment) based on total weight of the polymer in the latex, wherein about 25% to about 75% by weight of all 1,2 units are present in the polymer backbone and about 75% to about 25% by weight of all 1,2 units are blocks grafted onto the polymer backbone. Furthermore, the 1,2 blocks grafted onto the polymer backbone are greater than about 5 diene units in length and preferably about 20 to about 100 diene units in length.

A second aspect disclosed herein is a novel process for producing the above-mentioned novel latices.

DESCRIPTION OF THE PRIOR ART

Efforts for producing polybutadiene latices have been disclosed in the art. In Makino et al., *Polymer* 23, 287–290 (1982) methods for producing polybutadienes with Co-Al catalysts in organic solvents are described. The polybutadienes produced consist of a base polymer chain with 1,2-units, wherein their chirality is either syndiotactic or atatic in nature. Moreover, Makino et al. further discloses that sequence distribution of isomeric units of 1,4 and 1,2 in polybutadiene backbones have been investigated by carbon 13 spectroscopy.

Still other investigators have focused their attention on polybutadienes. In Conti et al., *Polymer* 15, 816–818 (1974) methods for producing polybutadienes utilizing Al-V and n-BuLi catalysts in organic solvents are disclosed. The resulting polybutadienes were analyzed by carbon 13 spectroscopy which revealed that their backbones contained 85% 1,2-units and 15% 1,4-units.

The instant invention is patentably distinguishable from the above-mentioned references since, among other reasons, it relates to polybutadiene latices, as well as homologs derived therefrom, that contain 1,2 units grafted as blocks onto a polymer backbone, wherein the blocks are at least about 5 diene units in length and preferably about 20 to about 100 diene units in length. Additionally, the instant invention discloses a novel process for producing the same.

SUMMARY OF THE INVENTION

The novel polymer latices of the instant invention have a polymer backbone with structural units of the formulae

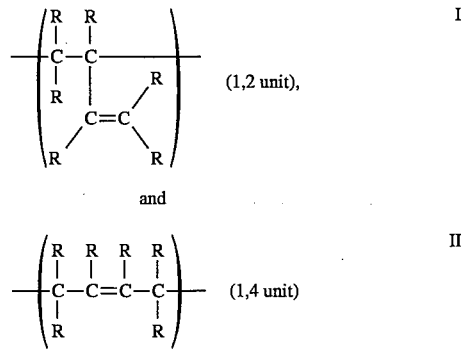

wherein each R is independently a hydrogen, lower alkyl ($C_1$–$C_5$ hydrocarbon), halogen or substituted or unsubstituted aromatic radical. It is often preferred that R is hydrogen so that the polymer backbone is polybutadiene.

It is noted that the polymer backbone described above is not limited to any cis- or trans-arrangement and that the relative chirality of the successive monomer units that make up the polymer backbone may be either isotactic, atactic or syndiotactic in nature. Moreover, the polymer backbone described above may include head-to-head, tail-to-tail and head-to-tail linkages between the respective monomer units.

The polydiene blocks grafted to the polymer backbone have structural units represented by the formula

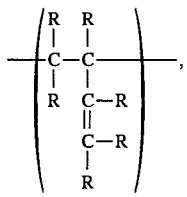

with or without randomly distributed structural units of the formula

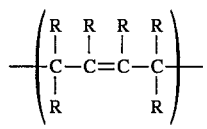

wherein R is as previously defined and each block is terminated with end groups such that each end group may independently be a hydrogen, lower ($C_1$–$C_5$) alkanol, halogen, carboxylic acid group, hydroxy group, nitrile group, nitro group, sulfonate group or an ester group. Further, the degree of polymerization of the structural unit represented by formula III is greater than about 5 and preferably about 20 to about 100. The degree of polymerization of the structural unit represented by formula IV is from 0 to about 0.25 the degree of polymerization of the structural unit represented by said formula III. The grafting of the polydiene blocks depicted by formulae III and IV to the above-described polymer backbone may be via addition to a double bond or coupling of an allylic radical. The polydiene blocks are not limited to any cis-or trans-arrangement themselves and the relative chirality of the successive monomer units that make up the polydiene blocks may be either isotactic, atactic or syndiotactic in nature. Moreover, the polydiene blocks may include head-to-head, tail-to-tail as well as head-to-tail linkages between the respective monomer units.

Furthermore, the novel latices described above have greater than about 20% by weight and up to about 50% by weight of 1,2 units (as represented by formulae I and III) based on total weight of the polymer in the latex, wherein about 25% to about 75% by weight of all 1,2 units are present in the polymer backbone and about 75% by weight to about 25% by weight of all 1,2 units are blocks grafted to said polymer backbone.

Additional features and advantages of the instant invention will be made evident upon reference to the following detailed description.

DETAILED DESCRIPTION OF THE PREFERRED EMBODIMENTS

The novel method for preparing the above-mentioned polymer latices comprises the steps of:
(a) dissolving polydienes in monomeric dienes under emulsion polymerization conditions to polymerize said monomeric dienes and graft said polydienes to produce polymer latices; and
(b) recovering polymer latices.

The polydiene of step (a) is represented above by formulae III and IV and the dienes of step (a) are represented by the formula

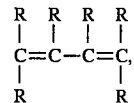

wherein R is as previously defined and is preferably hydrogen so that the diene is 1,3-butadiene.

The polymer latices of step (b) are as previously defined.

Conventional emulsion polymerization systems consist of water (30–70%), a surfactant (such as sodium lauryl sulfate, dodecylamine hydrochloride or fatty acid soaps) as well as a free-radical generator (such as alkali persulfate or organic peroxide). The monomers being polymerized may be added gradually to the polymerization system or they may all be present from the start. Further, the polymer produced is often isolated by coagulation, solvent evaporation or spray drying.

It is further within the scope of this invention to add vinyl monomers such as acrylonitrile, divinylbenzene and styrene to the emulsion polymerizations described above since they are conventionally employed to alter the properties of polymer latices.

In the instant invention, the polydienes represented by formulae III and IV typically have a number average molecular weight of about 500 to about 5,000 and they are added at the start of the polymerization reaction.

The examples and table are provided to further illustrate and facilitate the understanding of the invention. All products obtained can be confirmed by conventional techniques such as proton and carbon 13 nuclear magnetic resonance spectroscopy as well as electron microscopy and light scattering.

EXAMPLE 1

A small mouth, thick walled glass bottle was charged with 11.7 grams of fatty acid soap (derived from tall oil), 0.15 grams tetrasodium pyrophosphate, 0.10 grams of t-dodecyl mercaptan, 64.0 grams of demineralized water and 10 weight percent of 1,2-polybutadiene with a number average molecular weight of 1300. 50 grams of butadiene were then added to the bottle via distillation from a supply tank. Subsequently, the bottle was sealed with a rubber septum and bottle cap and 2.5 mL potassium persulfate solution (3.5% aqueous solution) was added to the bottle with a syringe. The bottle was then placed in a polymerization bath and agitated. The bath was heated to 63° C. over a one half hour period and maintained at that temperature for 9 hours. Following this period, the bath was maintained at 71° C. for five hours before being cooled to room temperature. Several drops of diethylhydroxylamine were added to deactivate any remaining initiator and to stabilize the emulsion. The desired polymer was recovered from the latex by coagulation, filtration, water washing and drying in a vacuum oven at 35° C.

EXAMPLE 2

Example 2 was prepared in a manner similar to Example 1 except that 400 grams of butadiene were added via distillation from a supply tank to an autoclave. All other reagents were added in increased amounts proportionate to the increase in butadiene and the desired polymer was recovered from the latex by coagulation, filtration, water washing and drying in a vacuum oven at 35° C.

The results in Table 1 have been prepared in the manner described by Examples 1 and 2. Said results confirm the unexpected results obtained in the invention.

TABLE 1

| Entry | (1,2-Polydiene additive[a] | Weight % of additive[b]* | Conversion %[b] | Weight % 1.2 units |
|---|---|---|---|---|
| 1 | hydroxy-terminated polybutadiene | 9.3 | 89 | 23 |
| 2 | polybutadiene | 10.4 | ~100 | 24 |
| 3 | polybutadiene | 20.0 | 86 | 31 |
| 4 | polybutadiene | 30.0 | 91 | 35 |
| 5 | carboxy-terminated polybutadiene[d] | 19.2 | 44 | — |
| 6 | carboxy-terminated polybutadiene[d] | 9.6 | 69 | — |
| 7 | — | 0.0 | 97 | 18 |

[a]number average molecular weight for all additives was 1,300
[b]based on initial butadiene.
[c]value based on conversion of butadiene to polymer.
[d]neutralized with KOH

*It is noted that proton NMR analysis of the product which is soluble in organic solvents, such as toluene, and proton NMR analysis of chloroform swollen insoluble polymer indicates that about 90% of all 1,2-polydiene additive is grafted to the polymer after about 15 hours of polymerization.

What is claimed is:

1. A polymer latex having:

(a) an atactic polymer backbone with structural units of the formulae

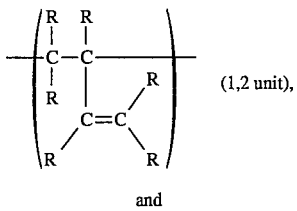

(1,2 unit), I

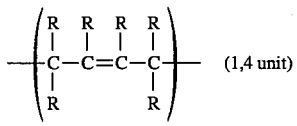

(1,4 unit) II wherein about 25% to about 75% by weight of all 1,2 units are present in the polymer backbone and about 75% by weight to about 25% by weight of all 1,2 units are blocks grafted to said polymer backbone and each R is independently a hydrogen, $C_1-C_5$ hydrocarbon, halogen or substituted or unsubstituted aromatic radical; and (b) polydiene blocks grafted onto said polymer backbone with structural units of the formula

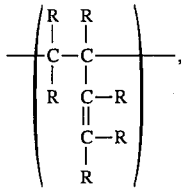

III with or without randomly distributed structural units of the formula

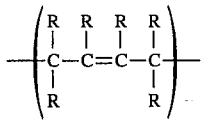

IV wherein each block is terminated with end groups and each end group is independently a hydrogen, $C_1-C_5$ alkanol, halogen carboxylic acid group, hydroxy group, nitride group, nitro group, sulfonate group or an ester group and the degree of polymerization of the structural unit represented by formula III is greater than about 5 and the degree of polymerization of the structural unit represented by formula IV is from 0 to about 0.25 the degree of polymerization of the structural unit represented by said formula III.

2. A polymer latex in accordance with claim 1 wherein the degree of polymerization of the structural unit represented by formula III is from about 20 to about 100.

3. A polymer latex in accordance with claim 1 wherein said latex has greater than about 20% by weight and up to about 50% by weight of 1,2 units based on total weight of the polymer.

4. A polymer latex in accordance with claim 1 wherein, said polymer latex also has structural units derived from vinyl monomers selected from the group consisting of acrylonitrile, divinylbenzene and styrene.

* * * * *